Figure 1:
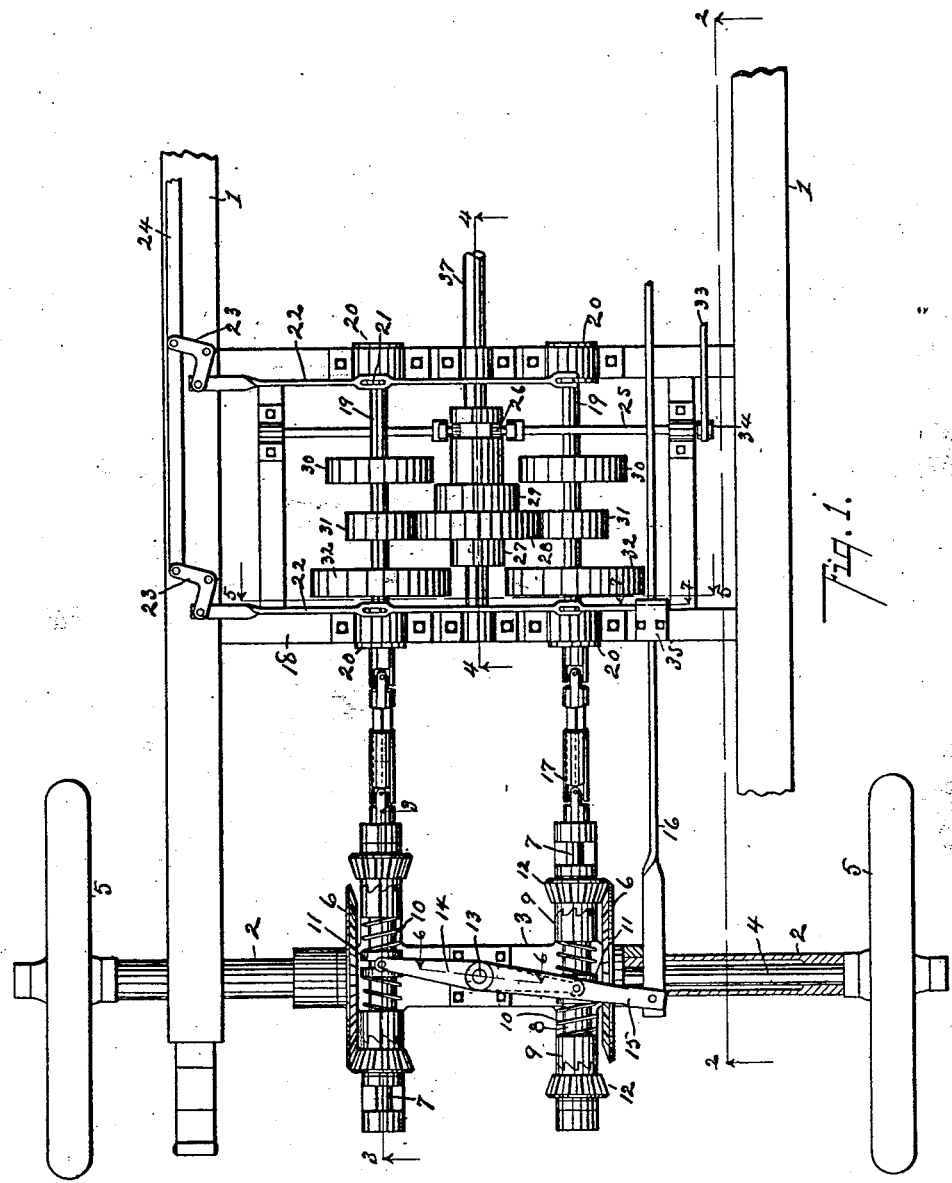

No. 872,220.  
PATENTED NOV. 26, 1907.  
A. P. BOYER.  
TRANSMISSION GEAR.  
APPLICATION FILED APR. 1, 1907.

3 SHEETS—SHEET 1.

Witnesses:  
Inventor,  
Allen P. Boyer  
By Chappell & Earl  
Att'ys

No. 872,220.
PATENTED NOV. 26, 1907.
A. P. BOYER.
TRANSMISSION GEAR.
APPLICATION FILED APR. 1, 1907.
3 SHEETS—SHEET 2.
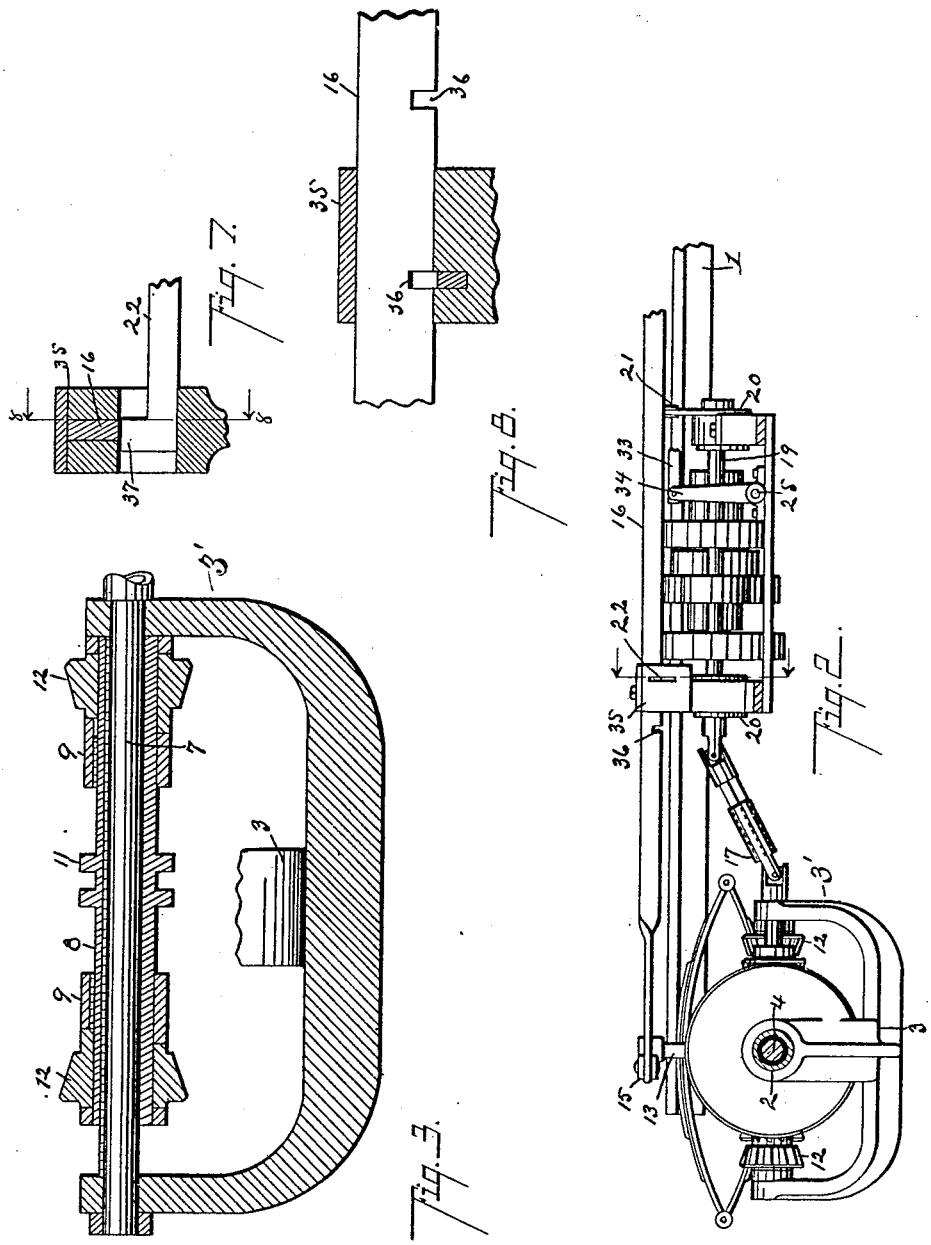
Witnesses:
Lulu Greenfield
Gertrude Tallman
Inventor,
Allyn P. Boyer
By Chappell & Earl
Att'ys No. 872,220. PATENTED NOV. 26, 1907.
A. P. BOYER.
TRANSMISSION GEAR.
APPLICATION FILED APR. 1, 1907.
3 SHEETS—SHEET 3.
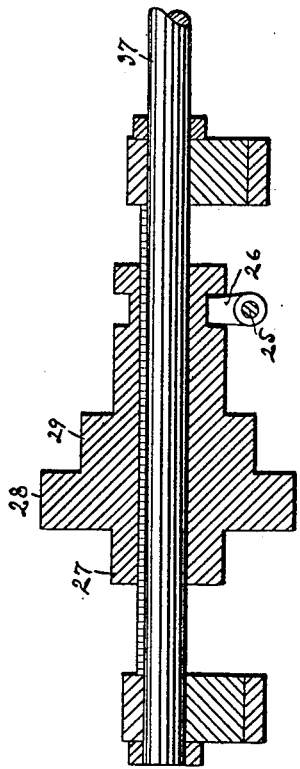
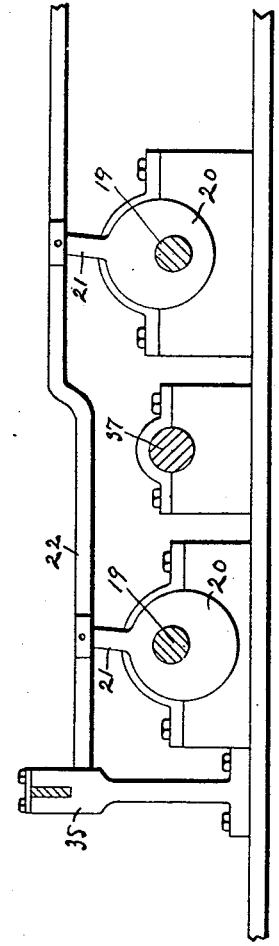
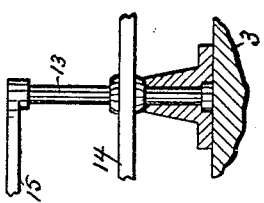

UNITED STATES PATENT OFFICE.

ALLEN P. BOYER, OF GOSHEN, INDIANA.

TRANSMISSION-GEAR.

No. 872,220.     Specification of Letters Patent.     Patented Nov. 26, 1907.

Application filed April 1, 1907. Serial No. 365,707.

*To all whom it may concern:*

Be it known that I, ALLEN P. BOYER, a citizen of the United States, residing at the city of Goshen, county of Elkhart, State of Indiana, have invented certain new and useful Improvements in Transmission-Gears, of which the following is a specification.

This invention relates to improvements in variable speed and reversing transmission gears.

The main objects of this invention are, first, to provide an improved variable speed and reversing transmission device, having friction gears, in which the strain on the gears and bearings is balanced and reduced to a minimum. Second, to provide an improved variable speed transmission device of the friction gear type, having a minimum amount of sliding friction of the gears upon each other. Third, to provide an improved variable speed transmission device of the friction gear type, in which the power is effectively delivered to the driving axle of a motor vehicle for driving the vehicle in either direction. Fourth, to provide an improved variable speed transmission device, which may be made comparatively light, and, at the same time, one which is capable of transmitting heavy loads and withstanding great strain.

Further objects, and objects relating to details of construction, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which, Figure 1 is a detail plan of a structure embodying the features of my invention. Fig. 2 is a detail longitudinal section taken on a line corresponding to line 2—2 of Fig. 1. Fig. 3 is an enlarged detail longitudinal section taken on a line corresponding to line 3—3 of Fig. 1, the gear shaft 7 being shown in full lines. Fig. 4 is an enlarged detail longitudinal section taken on a line corresponding to line 4—4 of Fig. 1, the driving shaft 37 being shown in full lines. Fig. 5 is an enlarged transverse section taken on a line corresponding to line 5—5 of Fig. 1, showing the details for adjusting the driven shafts 19. Fig. 6 is an enlarged detail section, taken on a line corresponding to line 6—6 of Fig. 1, showing the details of the reversing mechanism. Fig. 7 is an enlarged detail section taken on a line corresponding to line 7—7 of Fig. 1, showing the locking means for the reversing mechanism. Fig. 8 is an enlarged detail section taken on a line corresponding to line 8—8 of Fig. 7.

In the drawing, the sectional views are taken looking in the direction of the little arrows at the ends of the section lines, and similar numerals of reference refer to similar parts throughout the several views.

Referring to the drawing, 1 represents the frame of a vehicle body, and 2 the rear axle of a motor vehicle, the same being made up of tubular sections connected by a yoke 3. The axle shafts 4 are arranged in the tubular sections 2, the wheels 5 being secured to the shafts. On the inner ends of the axle shafts are beveled gears 6. Arranged transversely of the axle shafts and between the gears 6 is a pair of gear shafts 7. These gear shafts are arranged in suitable bearings provided therefor in the yokes 3', the yokes being arranged transversely of the yoke 3; see Figs. 2 and 3.

On each gear shaft is splined a sleeve 8 on which the beveled gears 12 are revolubly mounted. These sleeves 8 are shifted on the shafts to bring one or the other of the gears 12 into mesh with the gears 6 on the axle shafts. The gears 12 are secured to the sleeves by means of the collar-like clutch members 9, which are splined upon the sleeves; see Fig. 3.

The clutch members 9 are provided with ratchet teeth, as are also the hubs of the gears 12, the teeth being held yieldingly in engagement by means of the coiled springs 10. By this connection, the gears are allowed to slip and thereby prevent skidding of the wheels in turning the vehicle. The sleeves 8 are connected to be shifted simultaneously in opposite directions by means of the pivoted lever 14, the lever being forked to engage the annular grooves 11 in the sleeves. The lever 14 is mounted on the centrally-arranged pivot or rock shaft 13, which is operated through the arm 15 and the link or rod 16.

The gear shafts 7 are connected by combination universal and slip couplings 17 to the driven shafts 19. These driven shafts are eccentrically arranged in the adjustable bearings 20, supported on the cross-piece 18 of the body frame.

The bearings 20 are provided with upwardly-projecting arms 21, which are connected by means of the links 22, so that they are actuated together. These links are connected by the crank levers 23 to the actuating rod or link 24.

I provide the driven shafts with a plurality of friction gears, as 30, 31 and 32, the gears being of different diameters. The driving shaft 37 is provided with a plurality of friction gears, 27, 28 and 29, which are adapted to be brought into driving engagement with the gears 32, 31 and 30, respectively, of the driven shafts. The gears 27, 28 and 29 are preferably formed integral and are splined upon the driving shaft 37. These gears are adjusted by means of the rock shaft 25, having a forked arm 26 thereon arranged to engage the hub of these gears, which is provided with a suitable annular groove for the purpose. The rock shaft 25 is actuated by means of the operating rod or link 33, which is connected to an arm 34 on the rock shaft.

When it is desired to vary the driving speed, the driven shafts are moved outwardly through the mechanism described to disengage the gears. The gears on the driving shaft may then be adjusted thereon to bring the desired set into position, and the driven shafts adjusted to cause the same to engage. It is evident that the gears on the driven shafts might be mounted to be adjusted thereon instead of adjusting the gears on the driving shaft to bring them into proper position.

The reversing mechanism is accomplished through the mechanism described. In order to prevent the reversing while the gears are in driving engagement, one of the links 22 is provided with a stop 37 adapted to engage suitable notches 36 in the operating link 16 for the reversing mechanism. When the driven shafts are in their inner position, or in the position to bring the gears into driving engagement, this stop engages the one or the other of the notches 36, thereby effectively locking the reversing mechanism. The links 16 and 22 are arranged transversely of suitable slots provided therefor in the bracket 35, so that they are effectively supported in their engaging position.

By thus arranging the parts, I secure a variable speed and reversing mechanism having friction gears, in which the strain upon the driving and transmission shaft is reduced to a minimum; also a transmission device which is capable of driving in either direction with equal facility, the structure illustrated having three speeds. It is evident that the number of speeds could be increased by increasing the number of the gears.

I have illustrated a simple form of adjustable bearing, but it is evident that any suitable form might be used in this connection. By arranging the parts as I have illustrated, I obtain a friction transmission device in which there is no friction other than is necessary to secure the transmission of the power. My improved transmission device is simple in construction and may be made of comparatively light material, and, at the same time, possess sufficient strength to withstand all ordinary strain.

I have illustrated and described my improved transmission and reversing gear in detail in the form preferred by me on account of its structural simplicity and economy. I am aware, however, that it is capable of very great variation in structural details without departing from my invention, and I desire to be understood as claiming the same specifically as illustrated as well as broadly.

Having thus described my invention, what I claim as new and desire to secure by Letters Patent is:

1. The combination with the axle shafts, of gears thereon; a pair of gear shafts arranged transversely of said axle shafts; sleeves splined upon said gear shafts; pairs of gears revolubly mounted on said sleeves adapted to alternately engage said axle gears as said sleeves are shifted; pairs of ratchet clutch members through which said gears are connected to said sleeves, splined thereon; springs for holding said clutch members yieldingly in engagement with said gears; a pivoted lever connected to said sleeves for simultaneously shifting them in opposite directions, whereby the desired gears thereon are brought into mesh with said axle gears; a shifting link for said lever; a driving shaft; a pair of driven shafts arranged one at each side of said driving shaft and parallel thereto; combination universal and slip joints for connecting said driven shafts to said gear shafts; adjustable bearings for said driven shafts; connecting links for said bearings whereby they are adjusted in unison to throw them toward or from said driving shaft; a stop on one of the said connecting links for said adjustable bearings arranged to engage the operating link for said sleeve shifting lever; a plurality of friction gears of different diameters splined upon said driving shaft; means for shifting said gears on said driving shaft; and a plurality of gears of different diameters on said driven shafts, adapted to be brought into driving engagement with said gears on said driving shaft.

2. The combination with the axle shafts, of gears thereon; a pair of gear shafts arranged transversely of said axle shafts; sleeves splined upon said gear shafts; pairs of gears revolubly mounted on said sleeves adapted to alternately engage said axle gears as said sleeves are shifted; pairs of ratchet clutch members through which said gears are connected to said sleeves, splined thereon;

springs for holding said clutch members yieldingly in engagement with said gears; a driving shaft; a pair of driven shafts arranged one at each side of said driving shaft and parallel thereto; combination universal and slip joints for connecting said driven shafts to said gear shafts; adjustable bearings for said driven shafts; connecting links for said bearings, whereby they are adjusted in unison to throw them toward or from said driving shaft; a plurality of friction gears of different diameters splined upon said driving shaft; means for shifting said gears on said driving shaft; and a plurality of gears of different diameters on said driven shafts, adapted to be brought into driving engagement with said gears on said driving shaft.

3. The combination with the axle shafts, of gears thereon; a pair of gear shafts arranged transversely of said axle shafts; sleeves splined upon said gear shafts; pairs of gears revolubly mounted on said sleeves adapted to alternately engage said axle gears as said sleeves are shifted; pairs of ratchet clutch members through which said gears are connected to said sleeves, splined thereon; springs for holding said clutch members yieldingly in engagement with said gears; a pivoted lever connected to said sleeves for simultaneously shifting them in opposite directions, whereby the desired gears thereon are brought into mesh with said axle gears; a shifting link for said lever; a driving shaft; a pair of driven shafts arranged one at each side of said driving shaft and parallel thereto; connections for said driven shafts to said gear shafts; adjustable bearings for said driven shafts; connecting links for said bearings, whereby they are adjusted in unison to throw them toward or from said driving shaft; a stop on one of the said connecting links for said adjustable bearings to engage the operating link for said sleeve shifting lever; a plurality of friction gears of different diameters splined upon said driving shaft; means for shifting said gears on said driving shaft; and a plurality of gears of different diameters on said driven shafts, adapted to be brought into driving engagement with said gears on said driving shaft.

4. The combination with the axle shafts, of gears thereon; a pair of gear shafts arranged transversely of said axle shafts; sleeves splined upon said gear shafts; pairs of gears revolubly mounted on said sleeve adapted to alternately engage said axle gears as said sleeves are shifted; pairs of ratchet clutch members through which said gears are connected to said sleeves, splined thereon;
springs for holding said clutch members yieldingly in engagement with said gears; a driving shaft; a pair of driven shafts arranged one at each side of said driving shaft and parallel thereto; connections for said driven shafts to said gear shafts; adjustable bearings for said driven shafts; connecting links for said bearings, whereby they are adjusted in unison to throw them toward or from said driving shaft; a plurality of friction gears of different diameters splined upon said driving shaft; means for shifting said gears on said driving shaft; and a plurality of gears of different diameters on said driven shafts, adapted to be brought into driving engagement with said gears on said driving shaft.

5. The combination with the axle shafts, of gears thereon; a pair of gear shafts arranged transversely of said axle shafts; sleeves splined upon said gear shafts; pairs of gears on said sleeves adapted to alternately engage said axle gears as said sleeves are shifted; a pivoted lever connected to said sleeves for simultaneously shifting them in opposite directions, whereby the desired gears thereon are brought into mesh with said axle gears; a shifting link for said lever; a driving shaft; a pair of driven shafts arranged one at each side of said driving shaft and parallel thereto; combination universal and slip joints for connecting said driven shafts to said gear shafts; adjustable bearings for said driven shafts; connecting links for said bearings, whereby they are adjusted in unison to throw them toward or from said driving shaft; a stop on one of the said connecting links for said adjustable bearings arranged to engage the operating link for said sleeve shifting lever; a plurality of friction gears of different diameters splined upon said driving shaft; means for shifting said gears on said driving shaft; and a plurality of gears of different diameters on said driven shafts, adapted to be brought into driving engagement with said gears on said driving shaft.

6. The combination with the axle shafts, of gears thereon; a pair of gear shafts arranged transversely of said axle shafts; sleeves splined upon said gear shafts; pairs of gears on said sleeves adapted to alternately engage said axle gears as said sleeves are shifted; a driving shaft; a pair of driven shafts arranged one at each side of said driving shaft and parallel thereto; combination universal and slip joints for connecting said driven shafts to said gear shafts; adjustable bearings for said driven shafts; connecting links for said bearings, whereby they are adjusted in unison to throw them toward or from said driving shaft; a plurality of friction gears of different diameters splined upon said driving shaft; means for shifting said gears on said driving shaft; and a plurality of gears of different diameters on said driven shafts, adapted to be brought into driving engagement with said gears on said driving shaft.

7. The combination with the axle shafts, of gears thereon; a pair of gear shafts arranged transversely of said axle shafts; sleeves splined upon said gear shafts; pairs of gears on said sleeves adapted to alternately engage said axle gears as said sleeves are shifted; a pivoted lever connected to said sleeves for simultaneously shifting them in opposite directions, whereby the desired gears thereon are brought into mesh with said axle gears; a shifting link for said lever; a driving shaft; a pair of driven shafts arranged one at each side of said driving shaft and parallel thereto; connections for said driven shafts to said gear shafts; adjustable bearings for said driven shafts; connecting links for said bearings, whereby they are adjusted in unison to throw them toward or from said driving shaft; a stop on one of the said connecting links for said adjustable bearings arranged to engage the operating link for said sleeve shifting lever; a plurality of friction gears of different diameters splined upon said driving shaft; means for shifting said gears on said driving shaft; and a plurality of gears of different diameters on said driven shafts, adapted to be brought into driving engagement with said gears on said driving shaft.

8. The combination with the axle shafts, of gears thereon; a pair of gear shafts arranged transversely of said axle shafts; sleeves splined upon said gear shafts; pairs of gears on said sleeves adapted to alternately engage said axle gears as said sleeves are shifted; a driving shaft; a pair of driven shafts arranged one at each side of said driving shaft and parallel thereto; connections for said driven shafts to said gear shafts; adjustable bearings for said driven shafts; connecting links for said bearings, whereby they are adjusted in unison to throw them toward or from said driving shaft; a plurality of friction gears of different diameters splined upon said driving shaft; means for shifting said gears on said driving shaft; and a plurality of gears of different diameters on said driven shafts, adapted to be brought into driving engagement with said gears on said driving shaft.

9. The combination with the axle shafts, of gears thereon; a pair of gear shafts arranged transversely of said axle shafts; sleeves splined upon said gear shafts; pairs of gears revolubly mounted on said sleeves adapted to alternately engage said axle gears as said sleeves are shifted; pairs of ratchet clutch members through which said gears are connected to said sleeves, splined thereon; springs for holding said clutch members yieldingly in engagement with said gears; a pivoted lever connected to said sleeves for simultaneously shifting them in opposite directions, whereby the desired gears thereon are brought into mesh with said axle gears; a shifting link for said lever; a driving shaft; a pair of driven shafts arranged one at each side of said driving shaft and parallel thereto; connections for said driven shafts to said gear shafts; a plurality of friction gears of different diameters on said driving shaft; a plurality of gears of different diameters on said driven shafts; and means for connecting or disconnecting said gears on said driving and driven shafts adapted to lock said shifting link when the gears are connected.

10. The combination with the axle shafts, of gears thereon; a pair of gear shafts arranged transversely of said axle shafts; sleeves splined upon said gear shafts; pairs of gears revolubly mounted on said sleeves adapted to alternately engage said axle gears as said sleeves are shifted; a pivoted lever connected to said sleeves for simultaneously shifting them in opposite directions, whereby the desired gears thereon are brought into mesh with said axle gears; a shifting link for said lever; a driving shaft; a pair of driven shafts arranged one at each side of said driving shaft and parallel thereto; connections for said driven shafts to said gear shafts; a plurality of friction gears of different diameters on said driving shaft; a plurality of gears of different diameters on said driven shafts; and means for connecting or disconnecting said gears on said driving and driven shafts adapted to lock said shifting link when the gears are connected.

11. The combination with the axle shafts, of gears thereon; a pair of gear shafts arranged transversely of said axle shafts; sleeves splined upon said gear shafts; pairs of gears revolubly mounted on said sleeves adapted to alternately engage said axle gears as said sleeves are shifted; pairs of ratchet clutch members through which said gears are connected to said sleeves, splined thereon; springs for holding said clutch members yieldingly in engagement with said gears; means for simultaneously shifting said sleeves in opposite directions for reversing said axle shafts; a driving shaft; driving connections therefor to said gear shafts; and means for connecting or disconnecting said driving connections adapted to lock said shifting mechanism for said sleeves on said gear shafts when the shafts are connected.

12. The combination with the axle shafts, of gears thereon; a pair of gear shafts arranged transversely of said axle shafts; sleeves splined upon said gear shafts; pairs of gears revolubly mounted on said sleeves adapted to alternately engage said axle gears as said sleeves are shifted; means for simultaneously shifting said sleeves in opposite directions for reversing said axle shafts; a driving shaft; driving connections therefor to said gear shafts; and means for connecting or disconnecting said driving connections adapted to lock said shifting mechanism for said sleeves on said gear shafts when the shafts are connected.

13. The combination with the axle shafts, of gears thereon; a pair of gear shafts arranged transversely of said axle shafts; sleeves splined upon said gear shafts; pairs of gears revolubly mounted on said sleeves adapted to alternately engage said axle gears as said sleeves are shifted; pairs of ratchet clutch members through which said gears are connected to said sleeves, splined thereon; springs for holding said clutch members yieldingly in engagement with said gears; means for simultaneously shifting said sleeves in opposite directions for reversing said axle shafts; and driving connections for said gear shafts.

14. The combination with the axle shafts, of gears thereon; a pair of gear shafts arranged transversely of said axle shafts; pairs of gears on said gear shafts through which said axle gears may be driven in either direction; a shifting mechanism therefor; pairs of ratchet clutch members through which said gears on said gear shafts are connected thereto; a driving shaft; a plurality of gears of different diameters splined upon said driving shaft; means for shifting said gears on said driving shaft; a pair of driven shafts arranged one at each side of said driving shaft and parallel thereto; combination universal and slip joints for connecting said driven shafts to said gear shafts; adjustable bearings for said driven shafts; connecting links for said bearings whereby they are adjusted in unison to throw them toward or from said driving shaft; a plurality of gears of different diameters on said driven shafts adapted to be brought into engagement with said gears on said driving shaft; and means for locking said reversing mechanism when said driven shafts are connected to said driving shaft.

15. The combination with the axle shafts, of gears thereon; a pair of gear shafts arranged transversely of said axle shafts; pairs of gears on said gear shafts through which said axle gears may be driven in either direction; a shifting mechanism therefor; a driving shaft; a plurality of gears of different diameters splined upon said driving shaft; means for shifting said gears on said driving shaft; a pair of driven shafts arranged one at each side of said driving shaft and parallel thereto; combination universal and slip joints for connecting said driven shafts to said gear shafts; adjustable bearings for said driven shafts; connecting links for said bearings whereby they are adjusted in unison to throw them toward or from said driving shaft; a plurality of gears of different diameters on said driven shafts adapted to be brought into engagement with said gears on said driving shaft; and means for locking said reversing mechanism when said driven shafts are connected to said driving shaft.

16. The combination with the axle shafts, of gears thereon; a pair of gear shafts arranged transversely of said axle shafts; pairs of gears on said gear shafts through which said axle gears may be driven in either direction; a shifting mechanism therefor; pairs of ratchet clutch members through which said gears on said gear shafts are connected thereto; a driving shaft; a plurality of gears of different diameters splined upon said driving shaft; means for shifting said gears on said driving shaft; a pair of driven shafts arranged one at each side of said driving shaft and parallel thereto; combination universal and slip joints for connecting said driven shafts to said gear shafts; adjustable bearings for said driven shafts; connecting links for said bearings whereby they are adjusted in unison to throw them toward or from said driving shaft; and a plurality of gears of different diameters on said driven shafts adapted to be brought into engagement with said gears on said driving shaft.

17. The combination with the axle shafts, of gears thereon; a pair of gear shafts arranged transversely of said axle shafts; pairs of gears on said gear shafts through which said axle gears may be driven in either direction; a shifting mechanism therefor; a driving shaft; a plurality of gears of different diameters splined upon said driving shaft; means for shifting said gears on said driving shaft; a pair of driven shafts arranged one at each side of said driving shaft and parallel thereto; combination universal and slip joints for connecting said driven shafts to said gear shafts; adjustable bearings for said driven shafts; connecting links for said bearings whereby they are adjusted in unison to throw them toward or from said driving shaft; and a plurality of gears of different diameters on said driven shafts adapted to be brought into engagement with said gears on said driving shaft.

18. The combination with a driving shaft, of a plurality of gears of different diameters splined upon said driving shaft; means for shifting said gears on said driving shaft; a pair of driven shafts arranged one at each side of said driving shaft and parallel thereto; rotatable bearings in which said driven shafts are eccentrically arranged; connecting links for said bearings whereby they are adjusted in unison to throw them toward or from said driving shaft; and a plurality of gears of different diameters on said driven shafts adapted to be brought into engagement with said gears on said driving shaft.

19. The combination with a driving shaft, of a plurality of gears of different diameters splined upon said driving shaft; means for shifting said gears on said driving shaft; a pair of driven shafts arranged one at each side of said driving shaft and parallel thereto; adjustable bearings for said driven shafts; connecting links for said bearings whereby they are adjusted in unison to throw them toward or from said driving shaft; and a plurality of gears of different diameters on said driven shafts adapted to be brought into engagement with said gears on said driving shaft.

20. The combination with a driving shaft, of a plurality of gears of different diameters splined upon said driving shaft; means for shifting said gears on said driving shaft; a pair of adjustably-supported driven shafts arranged one at each side of said driving shaft and parallel thereto; means for adjusting said driven shafts in unison to throw them toward or from said driving shaft; and a plurality of gears of different diameters on said driven shafts adapted to be brought into engagement with said gears on said driving shaft.

21. The combination with a driving shaft, of a plurality of gears of different diameters upon said driving shaft; a pair of adjustably-supported driven shafts arranged one at each side of said driving shaft and parallel thereto; means for adjusting said driven shafts in unison to throw them toward or from said driving shaft; and a plurality of gears of different diameters on said driven shafts adapted to be brought into engagement with said gears on said driving shaft.

In witness whereof, I have hereunto set my hand and seal in the presence of two witnesses.

ALLEN P. BOYER. [L. S.]

Witnesses:
   LLOYD L. BURRIS,
   MARTIN C. KESLER.